United States Patent
Zhu et al.

(10) Patent No.: US 12,242,611 B2
(45) Date of Patent: Mar. 4, 2025

(54) METHOD FOR SETTING BOOT DISK OF HBA CARD, APPARATUS, AND COMPUTER READABLE STORAGE MEDIUM APPLYING THE METHOD

(71) Applicant: Fulian Precision Electronics (Tianjin) Co., LTD., Tianjin (CN)

(72) Inventors: Jian-Hua Zhu, Tianjin (CN); Jie Yuan, Tianjin (CN)

(73) Assignee: Fulian Precision Electronics (Tianjin) Co., LTD., Tianjin (CN)

(*) Notice: Subject to any disclaimer, the term of this patent is extended or adjusted under 35 U.S.C. 154(b) by 113 days.

(21) Appl. No.: 18/131,850

(22) Filed: Apr. 6, 2023

(65) Prior Publication Data
US 2024/0104216 A1   Mar. 28, 2024

(30) Foreign Application Priority Data
Sep. 27, 2022 (CN) .......................... 202211184672.3

(51) Int. Cl.
*G06F 21/57* (2013.01)
(52) U.S. Cl.
CPC .................................. G06F 21/572 (2013.01)
(58) Field of Classification Search
CPC ...... G06F 9/4416; G06F 21/572; G06F 3/067; H04L 67/1097
See application file for complete search history.

(56) References Cited

U.S. PATENT DOCUMENTS

| | | | | |
|---|---|---|---|---|
| 8,805,969 B2* | 8/2014 | Ravindran | ............... | H04L 67/34 |
| | | | | 709/220 |
| 10,394,573 B2* | 8/2019 | Mukadam | ............. | G06F 3/0685 |
| 12,045,480 B2* | 7/2024 | Mallick | ................. | G06F 3/0679 |
| 2006/0218388 A1* | 9/2006 | Zur | ........................ | G06F 9/4416 |
| | | | | 713/2 |
| 2007/0192466 A1* | 8/2007 | Nahum | ................. | G06F 9/4416 |
| | | | | 709/223 |

* cited by examiner

*Primary Examiner* — Brian T Misiura
(74) *Attorney, Agent, or Firm* — ScienBiziP, P.C.

(57) ABSTRACT

A method for setting a boot disk of a HBA card comprises acquires a physical layer port number corresponding to a slot of a target hard disk. A first identifier for the physical layer port number in a BIOS configuration page in the HBA card is configured. A second identifier for the target hard disk in the BIOS configuration page is configured. The second identifier is written into boot device items of the BIOS configuration page for fixing the target hard disk as a boot disk of the HBA card. The HBA card fails to identify other hard disk as the boot disk under any conditions. Drive letters of the HBA card and the rule of distributing the drive letters are unchanged, and a stability of a system is maintained. An apparatus and a computer readable storage medium applying the method are also disclosed.

19 Claims, 6 Drawing Sheets

METHOD FOR SETTING BOOT DISK OF HBA CARD, APPARATUS, AND COMPUTER READABLE STORAGE MEDIUM APPLYING THE METHOD

FIELD

The subject matter herein generally relates to computer technology.

BACKGROUND

A host device mounts a plurality of storage devices by a host bus adapter (HBA) card, such as a plurality of serial advanced technology attachment (SATA) hard disks, which cause a requirement of storing big data to be satisfied. A consistent corresponding relationship between hard disk slots in the HBA card and drive letters in an operation system may not have been established. During booting the HBA card, the hard disk being firstly identified serves as a boot disk, which may cause errors in some situations, such as position errors while reading or writing data.

There is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
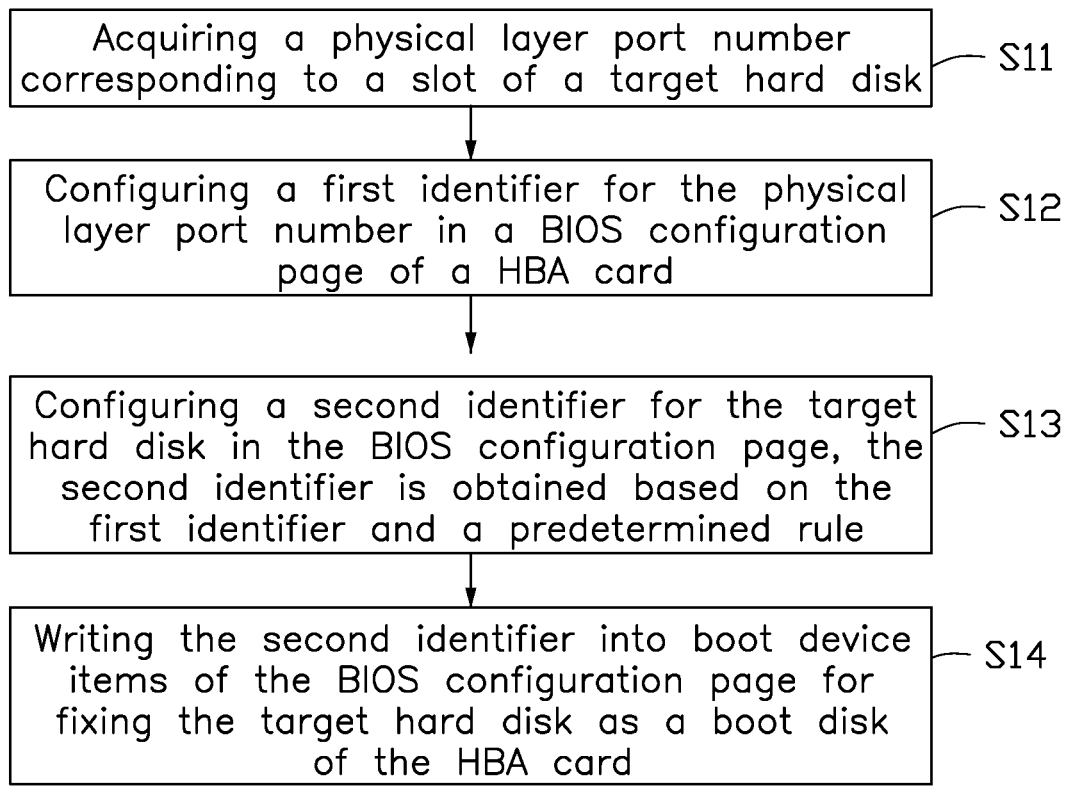
FIG. 1 is a flowchart illustrating a first embodiment of a method for setting a boot disk of a HBA card according to the present disclosure.

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure. It will be understood that the specific embodiments described herein are merely some embodiments and not all.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Terms "first", "second", and the like used in the specification, the claims, and the accompanying drawings of the present disclosure are used to distinguish different objects rather than describe a particular order. A term "comprise" and its variations are intended to cover a non-exclusive inclusion. For example, a process, method, system, product, or apparatus including a series of steps or units is not limited to the listed steps or units, and may optionally include other steps or units that are not listed, or other steps or units inherent to the process, method, product, or device.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

In one embodiment, a referred host bus adapter (HBA) card uses for network exchange, which can be inserted into a computer or a mainframe, such as a board of a server. An inputting and outputting physical connection path is provided between a host device and storage apparatuses. In a related art, the host device is connected with a plurality of storage apparatuses by the HBA card, such as a plurality of serial ATA (SATA) hard disks for meeting a requirement of big data. There is not a consistent correspondence between hard disk slots in the HBA card and drive letters in an operation system. During booting the HBA card, the hard disk being firstly identified serves as a boot disk, which cause error situations, such as position errors while reading or writing data. Therefore, while configuring the HBA card for the host device, the boot disk needs to be fixed at a target slot. A method for setting a boot disk of the HBA card is described as below.

FIG. 1 shows a flowchart of the method for setting the boot disk of the HBA card, the method may comprise at least the following steps, which also may be re-ordered.

In block S11, a physical layer port number corresponding to a slot of a target hard disk is acquired.

In one embodiment, according to a connection specification of serial attached SCSI, data between different devices are transmitted in a point-to-point manner. There is an initiator and a receiver while data transmitting. The initiator and the receiver are existed while transmitting data between the HBA card and the hard disk. The initiator may be a physical layer port of the HBA card, which is a SATA slot of the HBA card. The hard disk connected with the physical layer port is the receiver. While transmitting data between the initiator and the receiver, identifiers are needed as a device name for addressing. The identifiers are in institute of electrical and electronics engineers (IEEE) registered format.

Therefore, for fixing one of target hard disks connected with the HBA card as a boot disk, the corresponding identifier of the physical layer port needs to be fixed firstly. For fixing the corresponding identifier of the physical layer port, a physical layer port number of the slot of the target hard disk as the boot disk needs to be acquired firstly.

In one embodiment, the physical layer port number may be acquired based on a hardware circuit diagram of the HBA card. For example, when a drive letter of the target hard disk as the boot disk is slot0, a physical position corresponding to the slot0 is searched in the hardware circuit diagram for acquiring the physical layer port. Or the physical layer port number corresponding to the slot of the target hard disk can be found by searching a specification of the HBA card, which is not limited.

In block S12, a first identifier for the physical layer port number in a BIOS configuration page in the HBA card is configured.

In one embodiment, initial identifier of the physical layer port number in the HBA card is defined based on an extension of the identifier of the HBA card, which are default distributed by firmware of the HBA card. Each initial identifier is unique. Difference HBA cards corresponding to different initial identifiers. Due to a same SATA hard disk, while connecting with different HBA cards, the initial identifiers of the different HBA cards are different. Thus, it is difficult for managing the SATA hard disk. For providing a same identifier to the SATA hard disk while connecting with different HBA cards, the fixed first identifier is configured for the physical layer port in the BIOS configuration page of the firmware of the HBA card. The first identifier is satisfied with the IEEE registered format.

In block S13, a second identifier for the target hard disk in the BIOS configuration page is configured. The second identifier is obtained based on the first identifier and a predetermined rule.

In the embodiment, there is no identifier corresponding to the target hard disk connected with the HBA card. Therefore, during the configuring process, the content of the first identifier is combined under the predetermined rule to acquire the second identifier according to the content of the first identifier. Thus, the second identifier and the first identifier are closely related.

In block S14, the second identifier is written into boot device items of the BIOS configuration page for fixing the target hard disk as a boot disk of the HBA card.

In one embodiment, after acquiring the second identifier and configuring the BIOS configuration page of the HBA card by the second identifier, the second identifier is written into the boot device items of the BIOS configuration page, thus the target hard disk is configured as a boot disk. During the configuring process of the boot disk of the HBA card, the target hard disk is fixed as the boot disk of the HBA card, and the HBA card fails to identify other hard disks as the boot disk under any conditions. Therefore, corresponding relationships between the physical slots of the HBA card and the drive letters fails to be disrupted. In the foregoing process, the drive letters of the HBA card and the rule of distributing the drive letters are unchanged, the stability of the operation system is maintained.

Figure 2:
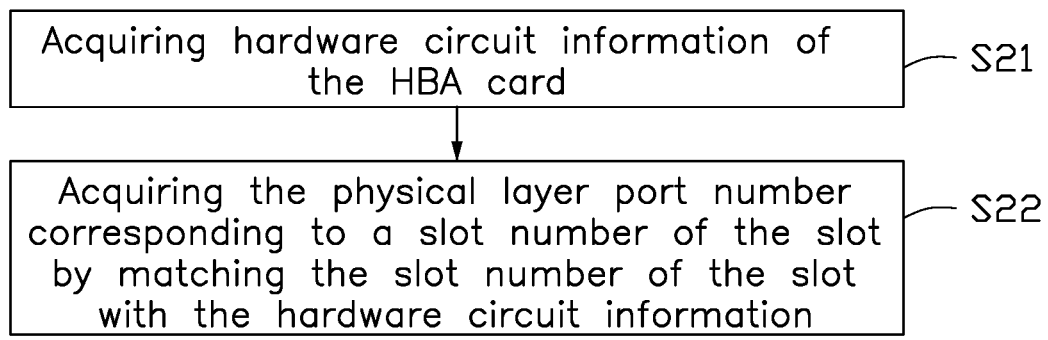
FIG. 2 is a detail flowchart illustrating an embodiment of the block S11 of the flowchart in FIG. 1 according to the present disclosure.

FIG. 2 shows a detail flowchart of the block S11. The block S11 further includes the following steps.

In block S21, hardware circuit information of the HBA card is acquired.

In block S22, the physical layer port number corresponding to a slot number of the slot is acquired by matching the slot number of the slot with the hardware circuit information.

In one embodiment, the slot is a physical interface of the HBA card connected with the target hard disk. The hardware circuit information includes the relationship between the slot number and a corresponding physical layer port number. After acquiring the hardware circuit information, the physical layer port number corresponding to the slot is acquired by matching the slot number of the slot with the hardware circuit information.

Figure 3:
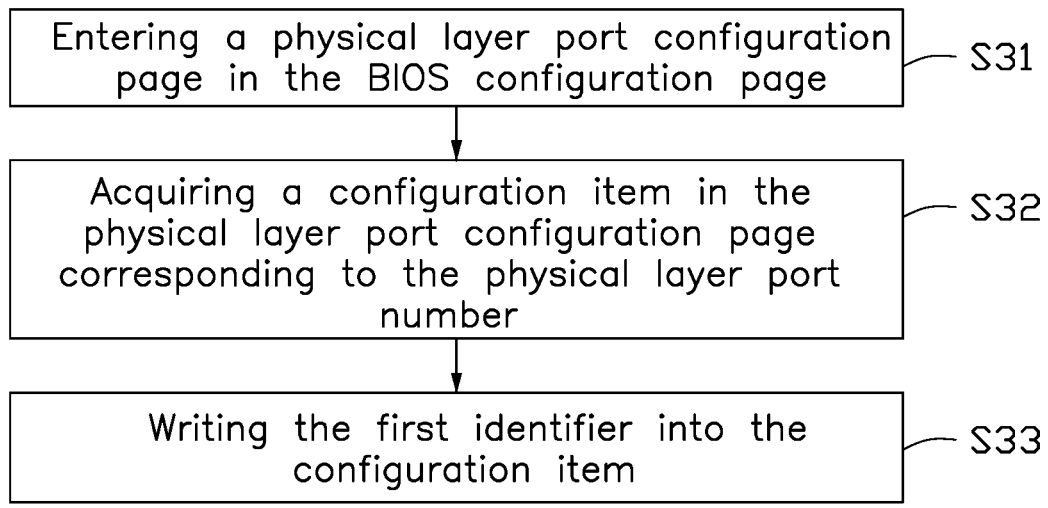
FIG. 3 is a detail flowchart illustrating an embodiment of the block S12 of the flowchart in FIG. 1 according to the present disclosure.

FIG. 3 shows a detail flowchart of the block S12. The block S12 further includes the following steps.

In block S31, a physical layer configuration page of the BIOS configuration page is entered.

In one embodiment, the physical layer configuration page may be a BIOSPage4 configuration page in the firmware of the HBA card. The BIOSPage4 configuration page defaults to configure an initial identifier to each physical layer port after the HBA card being booted. In the embodiment, in the BIOSPage4 configuration page, the first identifier is re-configured to the physical layer port, and the first identifier is recorded in a form, which is convenience for further managing.

In block S32, a configuration item is acquired in the physical layer port configuration page corresponding to the physical layer port number.

In one embodiment, there are a plurality of physical slots in the HBA card for connecting with a plurality of hard disks. Thus, there are a plurality of physical layer ports. Before writing the first identifier, the configuration item corresponding to the physical layer needs to be searched in the BIOSPage4 configuration page, and the default initial identifier in the configuration item is replaced by the first identifier.

In block S33, the first identifier is written into the configuration item.

In one embodiment, the first identifier is a string in fixed NAA IEEE Registered format. For example, the first identifier may be 5066554433221100.

Figure 4:
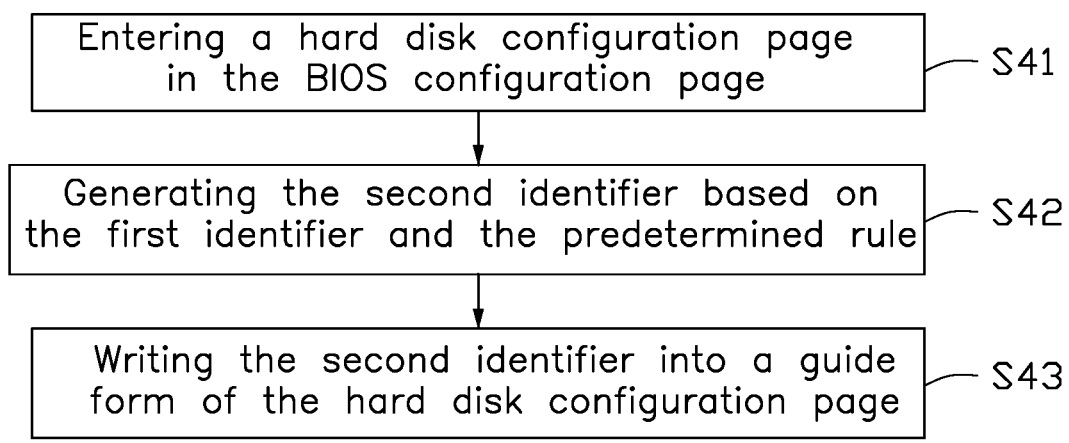
FIG. 4 is a detail flowchart illustrating an embodiment of the block S13 of the flowchart in FIG. 1 according to the present disclosure.

FIG. 4 shows a detail flowchart of the block S13. The block S13 further includes the following sub-steps.

In block S41, a hard disk configuration page is entered in the BIOS configuration page.

In one embodiment, the hard disk configuration page may be a BIOSPage2 configuration page in the firmware of the HBA card. By this configuration page, the second identifier of the target hard disk may be set at a configuration position of the boot disk for making the target hard disk as the boot disk of the HBA card. In the BIOSPage2 configuration page, the configuration item "ReqBootDeviceForm" is set as a fifth item. The format of the second identifier is set as NAA Locally Assigned format.

In block S42, the second identifier is generated based on the first identifier and the predetermined rule.

In one embodiment, the process of generating the second identifier may include replacing a head number of the first identifier by a predetermined number. For example, when the first identifier is "5066554433221100", the head number "5" represents an identifier of the physical layer port and is replaced by "3", thus the "3066554433221100" is the second identifier. The format of the second identifier is NAA Locally Assigned format.

In block S43, the second identifier is written into a guide form of the hard disk configuration page.

In one embodiment, the foregoing guide form may be an item "RequestedBootDevice" in the firmware configuration page of the HBA card, and the second identifier is written into the item "RequestedBootDevice", thus the operation of setting the target hard disk as the boot disk is accomplished.

Figure 5:
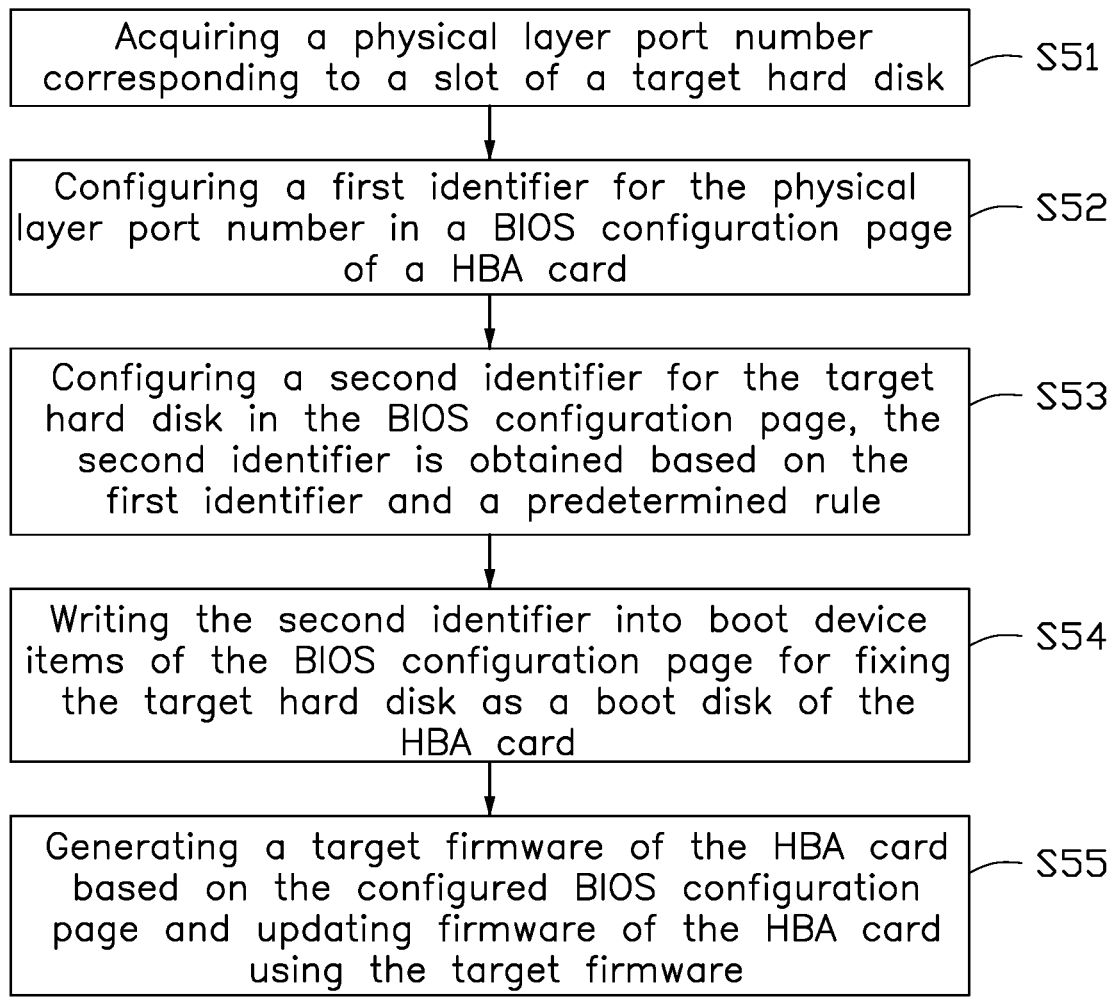
FIG. 5 is a flowchart illustrating a second embodiment of a method for setting a boot disk of a HBA card according to the present disclosure.

FIG. 5 shows a second embodiment of a method for setting a boot disk of a HBA card, the method may comprise at least the following steps, which also may be re-ordered.

In block S51, a physical layer port number corresponding to a slot of a target hard disk is acquired.

The block S51 is the same as the block S11, which will not be repeated here.

In block S52, a first identifier for the physical layer port number in a BIOS configuration page in the HBA card is configured.

The block S52 is the same as the block S12, which will not be repeated here.

In block S53, a second identifier for the target hard disk in the BIOS configuration page is configured. The second identifier is obtained based on the first identifier and a predetermined rule.

The block S53 is the same as the block S13, which will not be repeated here.

In block S54, the second identifier is written into boot device items of the BIOS configuration page for fixing the target hard disk as a boot disk of the HBA card.

The block S54 is the same as the block S14, which will not be repeated here.

In block S55, a target firmware of the HBA card is generated based on the configured BIOS configuration page and firmware of the HBA card is updated using the target firmware.

In the embodiment, according to the configured BIOS configuration page, the corresponding target firmware of the HBA card is repacked and generated. The original firmware is replaced by the target firmware. Or, when the HBA cards with a same model have a requirement of fixing a same target hard disk, the target firmware may directly use for a burning operation.

Figure 6:
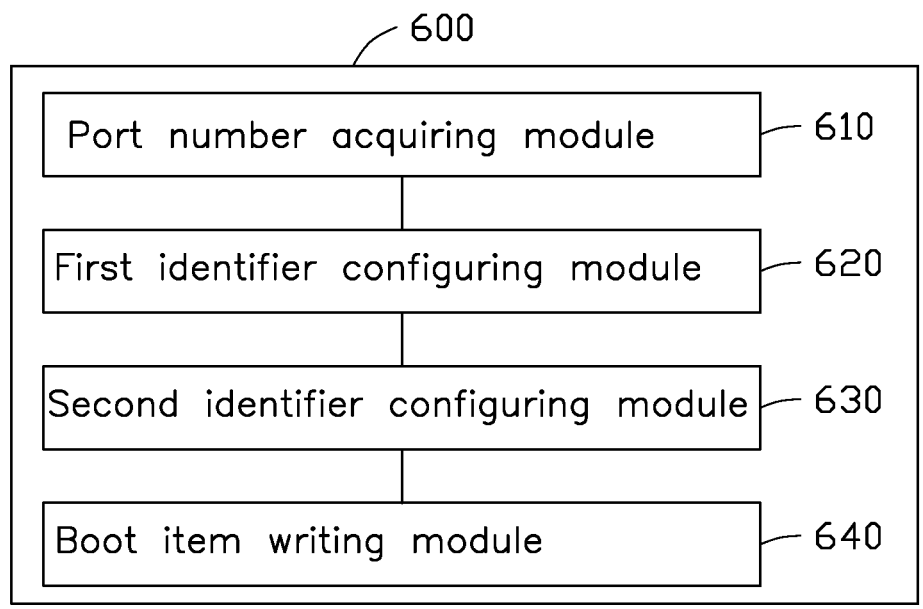
FIG. 6 is diagram illustrating an embodiment of an apparatus for setting a boot disk of a HBA card according to the present disclosure.

FIG. 6 shows the apparatus 600 for setting the boot disk of the HBA card. The apparatus 600 may include a port number acquiring module 610, a first identifier setting module 620, a second identifier setting module 630, and a boot item writing module 640.

The port number acquiring module 610 is configured to acquire a physical layer port number corresponding to a slot of a target hard disk.

The first identifier configuring module 620 is configured to configure a first identifier for the physical layer port number in a BIOS configuration page in the HBA card.

The second identifier configuring module 630 is configured to configure a second identifier for the target hard disk in the BIOS configuration page. The second identifier is obtained based on the first identifier and a predetermined rule.

The boot item writing module 640 is configured to write the second identifier into boot device items of the BIOS configuration page for fixing the target hard disk as a boot disk of the HBA card.

It should be understood that the more detail function of the foregoing modules in the embodiment may refer the foregoing corresponding content, which will not be repeated here.

An embodiment of the present disclosure further provides a computer readable storage medium. The computer readable storage medium stores instructions that, when executed by a computer or a processor, cause the computer or the processor to perform the foregoing method for setting the boot disk of the HBA card. If each component module of the apparatus for setting the boot disk of the HBA card is implemented in the form of a software functional unit and sold or used as an independent product, it can be stored in the computer readable storage medium.

In some embodiments, it may be implemented in whole or in part by software, hardware, firmware, or any combination thereof. When implemented in software, it may be implemented in whole or in part in the form of a computer program product including one or more computer instructions. When computer instructions are loaded and executed on a computer, all or part of the processes or functions according to the embodiments of the present disclosure are generated. The computer may be a general-purpose computer, a special purpose computer, a computer network, or other programmable device. Computer instructions may be stored in a computer-readable storage medium or transmitted from one computer-readable storage medium to another computer-readable storage medium. For example, computer instructions can be transmitted from a website, a computer, a server, or a data center to another website, computer, server, or data center through wired (e.g., coaxial cable, optical fiber, digital subscriber line (i.e., DSL)) or wireless (e.g., infrared, wireless, microwave, and the like). A computer-readable storage medium may be any usable media that can be stored and read by a computer or a data storage device such as a server or a data center, and the like. containing one or more usable media integrations. A usable media can be a magnetic media (e.g., floppy disk, hard disk, magnetic tape), an optical media (e.g., high-density digital video disc, i.e., DVD), or a semiconductor media (e.g., solid state disk, i.e., SSD), and the like.

A person having ordinary skills in the art can appreciate that all or part of the above embodiments may be realized through hardware related to corresponding the computer program. The computer program may be stored in a non-transitory computer-readable medium. When the program is executed by a processor, steps of the above embodiments of the disclosed method may be performed. The storage medium may include a magnetic disk, an optical disk, a read-only memory (ROM), or a random access memory (RAM), and the like. In the case where there is no conflict between the exemplary embodiments, the features of the following embodiments and examples may be combined with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for setting a boot disk of a HBA card, being applicable in an electronic device; the electronic device comprises a storage medium with computer programs and a processor; the processor executes the computer programs to implement following processes:
   acquiring a physical layer port number corresponding to a slot of a target hard disk;
   configuring a first identifier for the physical layer port number in a BIOS configuration page of the HBA card;
   configuring a second identifier for the target hard disk in the BIOS configuration page, the second identifier being configured based on the first identifier and a predetermined rule; and
   writing the second identifier into boot device items of the BIOS configuration page for fixing the target hard disk as a boot disk of the HBA card.

2. The method of claim 1, wherein the acquiring a physical layer port number corresponding to a slot of a target hard disk comprises:
   acquiring hardware circuit information of the HBA card; and
   acquiring the physical layer port number corresponding to a slot number of the slot by matching a slot number of a slot with the hardware circuit information.

3. The method of claim 1, wherein the configuring a first identifier for the physical layer port number in the BIOS configuration page of a HBA card comprises:
   entering a physical layer port configuration page in the BIOS configuration page;
   acquiring a configuration item in the physical layer port configuration page corresponding to the physical layer port number; and
   writing the first identifier into the configuration item.

4. The method of claim 1, wherein the first identifier is in Network Address Authority (NAA) Institute of Electrical and Electronics Engineers (IEEE) registered format.

5. The method of claim 1, wherein the configuring a second identifier for the hard disk in the BIOS configuration page comprises:
   entering a hard disk configuration page in the BIOS configuration page;
   generating the second identifier based on the first identifier and the predetermined rule; and
   writing the second identifier into a guide form of the hard disk configuration page.

6. The method of claim 5, wherein the generating the second identifier based on the first identifier and the predetermined rule comprises:
   replacing a head number of the first identifier by a predetermined number and acquiring the second identifier.

7. The method of claim 1, wherein the second identifier is in Network Address Authority (NAA) Locally Assigned format.

8. The method of claim 1, wherein the method further comprises:
   generating a target firmware of the HBA card based on the configured BIOS configuration page and updating firmware of the HBA card using the target firmware.

9. An apparatus comprises a storage medium and at least one processor; the storage medium stores at least one command; the at least one commands is implemented by the at least one processor to execute functions; the storage medium comprising:
   a port number acquiring module, configured to acquire a physical layer port number corresponding to a slot of a target hard disk;
   a first identifier setting module, configured to configure a first identifier for the physical layer port number in a BIOS configuration page in the HBA card;
   a second identifier setting module, configured to configure a second identifier for the target hard disk in the BIOS configuration page; the second identifier is obtained based on the first identifier and a predetermined rule; and
   a boot item writing module, configured to write the second identifier into boot device items of the BIOS configuration page for fixing the target hard disk as a boot disk of the HBA card.

10. The apparatus of claim 9, wherein the first identifier is in Network Address Authority (NAA) Institute of Electrical and Electronics Engineers (IEEE) registered format.

11. The apparatus of claim 9, wherein the second identifier is in Network Address Authority (NAA) Locally Assigned format.

12. A non-transitory computer readable storage medium, the non-transitory computer readable storage medium stores computer programs, and the computer programs are executed by at least one processor to implement following instructions:
   acquiring a physical layer port number corresponding to a slot of a target hard disk;
   configuring a first identifier for the physical layer port number in a BIOS configuration page of the HBA card;
   configuring a second identifier for the target hard disk in the BIOS configuration page, the second identifier is obtained based on the first identifier and a predetermined rule; and
   writing the second identifier into boot device items of the BIOS configuration page for fixing the target hard disk as a boot disk of the HBA card.

13. The non-transitory computer readable storage medium of claim 12, wherein the acquiring a physical layer port number corresponding to a slot of a target hard disk comprises:
   acquiring hardware circuit information of the HBA card; and
   acquiring the physical layer port number corresponding to a slot number of the slot by matching a slot number of a slot with the hardware circuit information.

14. The non-transitory computer readable storage medium of claim 12,
   wherein the configuring a first identifier for the physical layer port number in the BIOS configuration page of a HBA card comprises:
   entering a physical layer port configuration page in the BIOS configuration page;
   acquiring a configuration item in the physical layer port configuration page corresponding to the physical layer port number; and
   writing the first identifier into the configuration item.

15. The non-transitory computer readable storage medium of claim 12, wherein the first identifier is in Network Address Authority (NAA) Institute of Electrical and Electronics Engineers (IEEE) registered format.

16. The non-transitory computer readable storage medium of claim 12, wherein the configuring a second identifier for the hard disk in the BIOS configuration page comprises:
   entering a hard disk configuration page in the BIOS configuration page;

generating the second identifier based on the first identifier and the predetermined rule; and writing the second identifier into a guide form of the hard disk configuration page.

17. The non-transitory computer readable storage medium of claim 16, wherein the generating the second identifier based on the first identifier and the predetermined rule comprises:

replacing a head number of the first identifier by a predetermined number and acquiring the second identifier.

18. The non-transitory computer readable storage medium of claim 12, wherein the second identifier is in Network Address Authority (NAA) Locally Assigned format.

19. The non-transitory computer readable storage medium of claim 12, wherein the method further comprises:

generating a target firmware of the HBA card based on the configured BIOS configuration page and updating firmware of the HBA card using the target firmware.

* * * * *